(12) United States Patent
Hartenstein et al.

(10) Patent No.: US 9,565,030 B2
(45) Date of Patent: Feb. 7, 2017

(54) TESTING SYSTEM FOR A WIRELESS ACCESS DEVICE AND METHOD

(75) Inventors: Abraham Hartenstein, Chatsworth, CA (US); Ian A. Laity, San Diego, CA (US); Steven Smith, Ventura, CA (US); Andrew Little, Camarillo, CA (US); Steven Krattiger, Northridge, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 196 days.

(21) Appl. No.: 12/987,048

(22) Filed: Jan. 7, 2011

(65) Prior Publication Data

US 2012/0176906 A1     Jul. 12, 2012

(51) Int. Cl.
*H04L 12/26* (2006.01)
*H04W 24/06* (2009.01)
*H04W 88/06* (2009.01)

(52) U.S. Cl.
CPC ........... *H04L 12/2697* (2013.01); *H04L 43/50* (2013.01); *H04W 24/06* (2013.01); *H04W 88/06* (2013.01)

(58) Field of Classification Search
USPC ........................................................ 370/241
See application file for complete search history.

(56) References Cited

U.S. PATENT DOCUMENTS

| | | | | | |
|---|---|---|---|---|---|
| 5,952,983 | A  * | 9/1999 | Dearnley | ............... | H01Q 1/246 343/797 |
| 6,140,972 | A  * | 10/2000 | Johnston | ............... | H01Q 19/106 343/725 |
| 7,119,744 | B2 * | 10/2006 | Theobold | ............... | H01Q 1/007 343/700 MS |
| 2003/0210193 | A1* | 11/2003 | Rossman | ............. | H01Q 9/0464 343/725 |
| 2005/0237258 | A1* | 10/2005 | Abramov | ................. | H01Q 3/24 343/834 |
| 2006/0038738 | A1* | 2/2006 | Shtrom | ..................... | H01Q 3/24 343/876 |
| 2007/0266350 | A1* | 11/2007 | Fulga | ................. | G01R 31/2822 716/132 |
| 2008/0019695 | A1* | 1/2008 | Combs | ................ | H04J 14/0226 398/82 |
| 2009/0249993 | A1* | 10/2009 | Dowler | ................... | G09F 11/23 116/310 |

* cited by examiner

*Primary Examiner* — Yemane Mesfin
*Assistant Examiner* — Jeff Banthrongsack
(74) *Attorney, Agent, or Firm* — SoCal IP Law Group LLP; John E. Gunther; Steven C. Sereboff (57) ABSTRACT

A system for testing a wireless access device having a plurality of radio modules is provided. The system includes a housing having an interior chamber. The interior chamber is adapted to receive a wireless access device. A plurality of probes are positioned for respective alignment with an antenna of a corresponding radio module of the wireless access device. The plurality of probes are adapted to receive radio signals from the wireless access device.

31 Claims, 6 Drawing Sheets

TESTING SYSTEM FOR A WIRELESS ACCESS DEVICE AND METHOD

BACKGROUND

1. Field of the Invention

This invention relates to testing systems for wireless communication devices and more particularly to systems and methods for calibrating and testing integrated radio modules of wireless access devices.

2. Description of Related Art

The use of wireless communication devices for data networking continues to grow at a rapid pace. Data networks that use "WiFi" ("Wireless Fidelity"), also known as "Wi-Fi," are relatively easy to install, convenient to use, and supported by the IEEE 802.11 standard. WiFi data networks also provide performance that makes WiFi a suitable alternative to a wired data network for many business and home users.

WiFi networks operate by employing wireless access points that provide users, having wireless (or "client") devices in proximity to the access point, with access to varying types of data networks such as, for example, an Ethernet network or the Internet. The wireless access points include a radio that operates according to the standards specified in different sections of the IEEE 802.11 specification. Generally, radios in the access points communicate with client devices by utilizing omni-directional antennas that allow the radios to communicate with client devices in any direction. The access points are then connected (by hardwired connections) to a data network system that completes the access of the client device to the data network. The different standards under IEEE 802.11 define 'channels' that wireless devices, or clients, use when communicating with an access point.

Access points provide service to a limited number of users. Access points are assigned a channel on which to communicate. Some of the channels provided by different 802.11 standards overlap. Each channel allows a recommended maximum of 64 clients to communicate with the access point. In addition, access points must be spaced apart strategically to reduce the chance of interference, either between access points tuned to the same channel, or to overlapping channels. In addition, channels are shared. Only one user may occupy the channel at any give time. As users are added to a channel, each user must wait longer for access to the channel thereby degrading throughput.

Another degradation of throughput as the number of clients grow is the result of the use of omni-directional antennas. Certain access point technology may employ one or two radios in close proximity resulting in interference, which reduces throughput. In an example of a two radio access point, both radios may be utilized as access points (i.e., each radio communicates with a different client device) or one radio may function as the access point while the other radio functions as a backhaul, i.e., a communication channel from the access point to a network backbone, central site, and/or other access point. Typically, the interference resulting from the different antennas utilized with these radios limits the total throughput available and, as a result, reduces traffic efficiency at the access point.

High-end wireless devices recently developed include multiple radios to improve bandwidth, user density, signal strength, coverage area, signal management and load balancing. The development of these new wireless devices has resulted in the need for testing systems to calibrate and troubleshoot wireless communication hardware during development. Known testing systems may calibrate wireless communication devices in a wired fashion. As a result, accurate testing or calibration of the antennas of the wireless communication devices, in many instances, may not be accomplished. Accordingly, proper analysis of the operation of the antennas of the wireless communication devices may not result.

Thus, there is a need for a calibration and testing system that provides the ability to calibrate, test, and troubleshoot the integrated radio modules of wireless communication devices.

SUMMARY

A system for testing a wireless access device having a plurality of radio modules is provided. The system includes a housing having an interior chamber. The interior chamber is adapted to receive a wireless access device. A plurality of probes are positioned for respective alignment with an antenna of a corresponding radio module of the wireless access device. The plurality of probes are adapted to receive radio signals from the wireless access device.

A method for testing a wireless access device having a plurality of radio modules is also provided. A wireless access device is placed into an interior chamber of a housing. A plurality of probes are aligned with a corresponding antenna of a radio module of the wireless access device. The probes are adapted to receive radio signals from the wireless access device. The signals received at the probes from the wireless access device are transmitted for analysis.

DETAILED DESCRIPTION

In the following description of the preferred embodiment, reference is made to the accompanying drawings that form a part hereof, and which show, by way of illustration, a specific embodiment in which the invention may be practiced. Other embodiments may be utilized and structural changes may be made without departing from the scope of the present invention.

Figure 1:
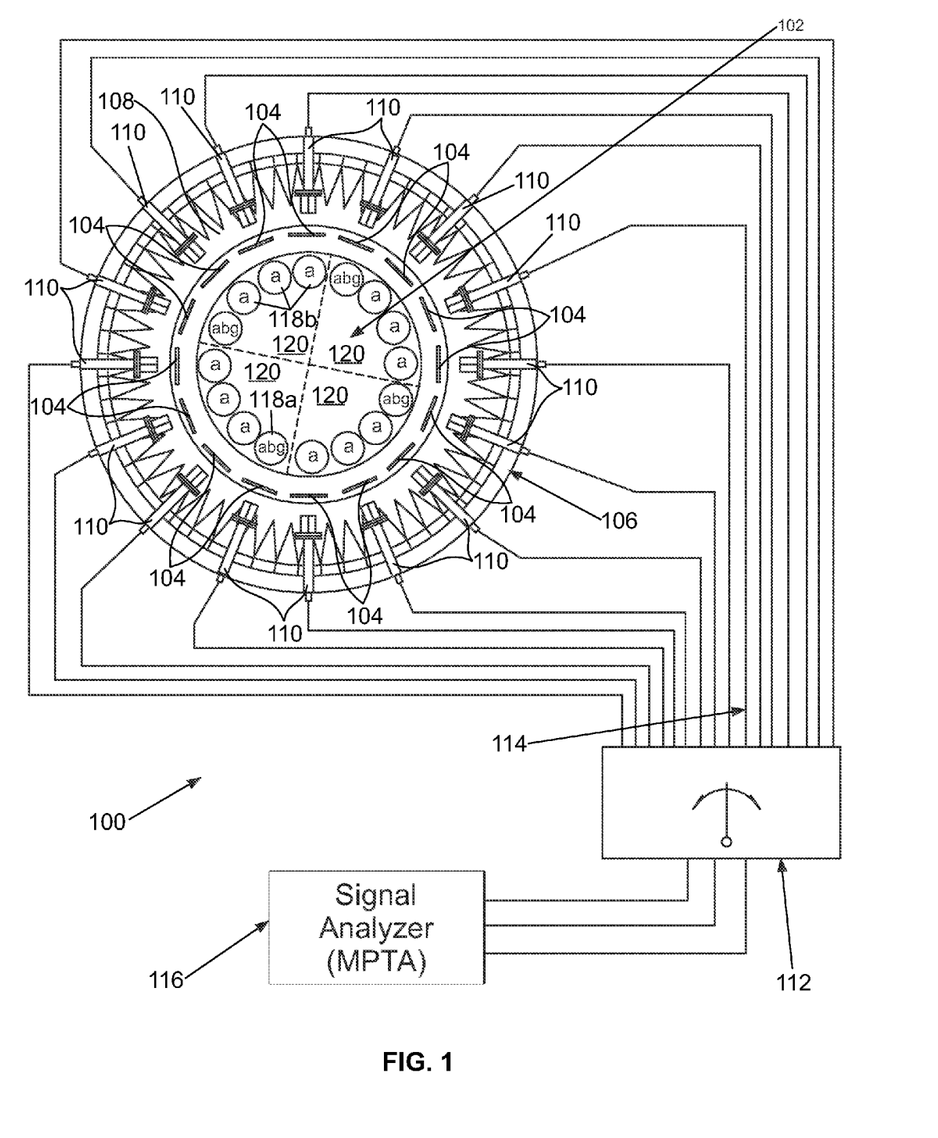
FIG. 1 is a top cross-sectional view of an example calibration and testing system for a wireless access device.

A calibration and testing system 100 for a wireless access device 102 is described herein. As shown in FIG. 1, the calibration and testing system 100 for a wireless access device 102 may be used to test, calibrate, and troubleshoot a wireless access device that includes multiple radio modules having antennas 104. The wireless access device 102 provides users, having wireless (or "client") devices in proximity to the access device, with access to varying types of data networks such as, for example, an Ethernet network or the Internet. The calibration and testing system for a wireless access device includes a housing 106 having an interior chamber 108 and multiple probes 110 positioned around the interior perimeter of the chamber.

As seen in FIG. 1, the probes 110 are positioned towards the center of the chamber 108, and each probe is positioned adjacent to an antenna 104 of the wireless access device 102. Each probe 110 is connected to a controller 112 via a coaxial cable 114, and the controller may be connected to a signal analyzer 116 for analyzing the signals from the antennas 104 of the wireless access device 102.

The wireless access device may have, for example, 8 or 16 radio modules 118*a-b*. Those skilled in the art will recognize that other wireless access devices having an alternative number of radio modules may be tested as well. The example wireless access device 102 shown in FIG. 1 has 16 radio modules 118 divided between four sectors 120. Each sector in the example wireless access device 102 includes one radio module 118*a* that conforms to the IEEE 802.11a, 802.11b, and 802.11g standard (802.11a, b, g) and includes three radio modules 118*b* that conform to the 802.11a standard only. Those skilled in the art will understand that the particular wireless access device described herein and shown in the figures is by way of example only. The wireless testing and calibration system described herein may be used to test, calibrate, and troubleshoot wireless access devices having more or less radio modules that conform to additional or alternative wireless standards.

Figure 2:
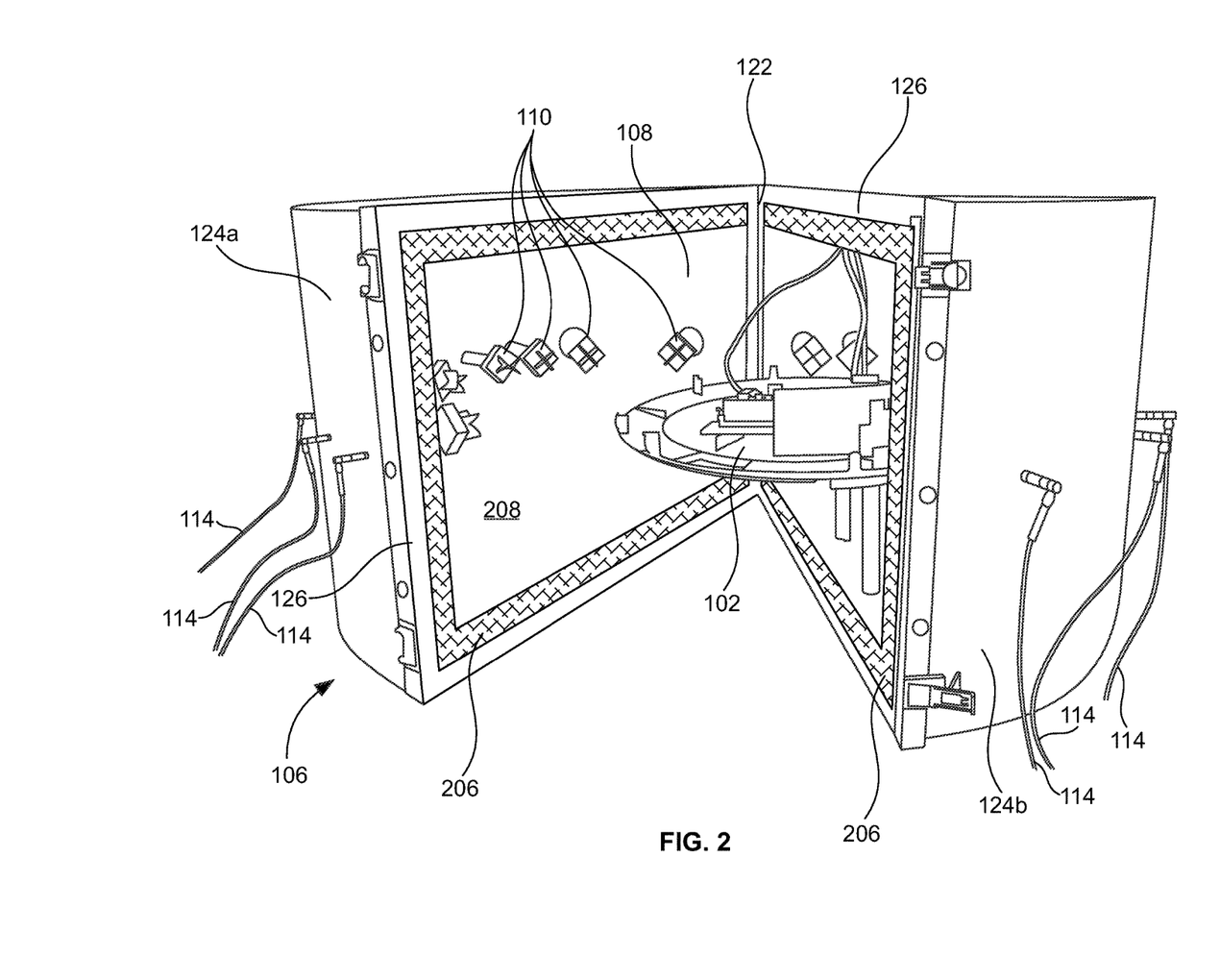
FIG. 2 is a top perspective view of an example calibration and testing system for a wireless access device in an open position.

Referring now to FIG. 2, an example housing 106 for an example calibration and testing system 100 for a wireless access device 102 is shown in an open position. The housing includes a body 122 having an interior chamber 108 for enclosing a wireless access device 102 during testing and calibration. The body 122 may be formed of a metallic material and have a cylindrical shape. The cylindrical metallic body may also be divided into a first cylinder half 124*a* and a second cylinder half 124*b* as seen in FIG. 2. The cylinder halves 124*a-b* may be connected via a hinge (not shown) allowing the cylinder halves to pivot relative to one another and provide access to the interior chamber 108. Alternative shapes for the body of the housing may be employed as well.

The interior chamber 108 of the body 122 may also have a cylindrical shape Like the body 122 of the housing 106, alternative shapes for the interior chamber may be selectively used. A wireless access device 102 may be positioned in or removed from the chamber 108 for calibration and testing. Each cylinder half 124*a-b* also includes a frame 126 around the perimeter of the interior chamber 108 at the interface of the cylinder halves. An electromagnetic interference (EMI) gasket 206 may be attached to one or both of the frames 126 to minimize any radio frequency (RF) interference from leaking into the chamber 108 when the housing 106 is in a closed position. The EMI gasket 206 may be formed, for example, from a foam material and covered with conductive fabric. The fabric may exhibit conductive properties as a result of being coated with a conductive material. EMI gaskets 206 attached to both frames 126 may also include multiple projections (not shown) having a circular or rectangular cross-section that mesh with each other when the housing 106 is in a closed position to fill any gaps or voids between the frames.

The surface of the interior chamber may include a broadband foam absorber 208. The broadband foam absorber 208 may have one or more layers of polyurethane foam treated with carbon. In this example, the broadband foam absorbers may have three layers, and each layer may have a different carbon density, which provides a conductivity gradient. A suitable broadband foam absorber may be available from Emerson & Cuming Microwave Products as product designation ECCOSORB® AN-77. Alternative broadband absorbing materials and structures may selectively be employed. As discussed further below with reference to FIG. 6, the cylindrical shape of the housing 106 and the broadband foam absorber 208 are designed to attenuate signal reflections and deflections.

Figure 3:
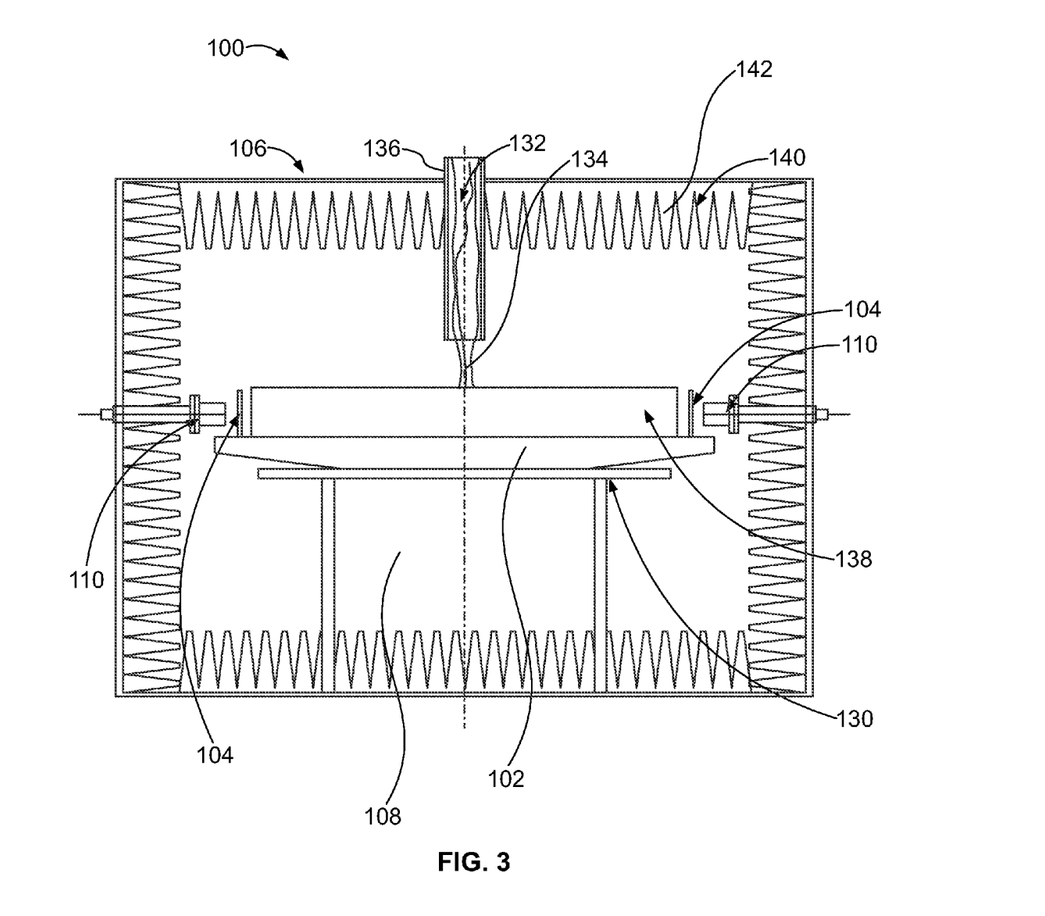
FIG. 3 is a side cross-sectional view illustrating an interior chamber of the example wireless calibration testing system of FIG. 1.

FIG. 3 is a side cross-sectional view of the chamber 108 of an example housing 106 with a wireless access device 102 installed in the chamber. As seen in FIG. 3, a mounting fixture 130 positions the wireless access device 102 near the center of the chamber 108 so that the antennas 104 of the wireless access device are positioned adjacent to a respective probe 110. The mounting fixture 130 may also be keyed to ensure placement of the wireless access device 102 in a particular orientation. For example, the wireless access device 102 may include one or more recesses (not shown) in the body of the device, and the mounting fixture 130 may include one or more projections (not shown) that correspond to the recesses of the wireless access device. Accordingly, an operator may ensure proper placement of the wireless access device 102 on the mounting fixture 130 by aligning the recesses and the projections and lowering the wireless access device onto the mounting fixture so that the projections are received within the recesses.

The housing 106 of the calibration and testing system 100 for a wireless access device 102 may also include an opening 132 in the top of the housing to allow passage of various interface cables 134 for connection to the wireless access device 102. For example, the motherboard of a wireless access device may include Ethernet ports, serial ports, and ports for power supply. Accordingly, interface cables 134 may be inserted into the chamber 108 of the housing 106 through the top opening 132 and connected to the appropriate port of the wireless access device 102. The interface cables 134 may transmit control signals for controlling and monitoring the wireless access device 102 during calibration and testing. The housing 106 may also include a cable guide 136 for the interface cables 134 that holds the cables in a constant position thus minimizing any interaction between the cables and the probes 110 or the antennas 104 of the wireless access device 102. The cable guide 136 may be a pipe inserted into the interior chamber 108 to provide passage for the interface cables 134. The pipe 136 may be constructed of, for example, any suitable plastic material.

A reflector ring 138 may also be positioned between the antennas 104 of a wireless access device 102. The reflector ring 138 isolates the antennas 104 from the digital components (not shown) of the wireless access device 102 as well as from each other to prevent interference. Further, the reflector ring 138 reflects energy from an antenna 104, which may focus the energy from the antenna as well as increase the directivity and gain of the antenna. The reflector ring 138 may be constructed of, for example, an aluminum sheet formed into a circular ring. In operation, the reflector ring 138 may be lowered onto the wireless access device 102 as shown in FIG. 3 where it may press against conductive gaskets (not shown) of the wireless access device. The conductive gaskets of the wireless access device 102 may exhibit conductive properties when pressure is applied.

Additionally, FIG. 3 also shows an absorbing layer 140 having pyramidal absorbers 142. As seen in FIG. 3, the apex of the pyramidal absorbers 142 point towards the interior of the chamber 108 and operate to attenuate deflected and reflected signals as discussed further below.

Figure 4:
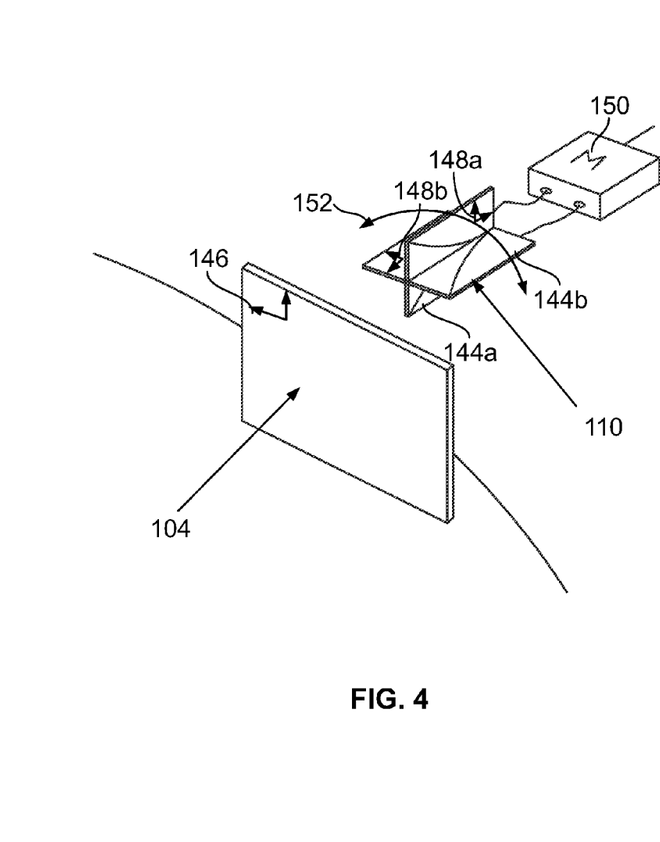
FIG. 4 is a top perspective view of an antenna under test and a probe that may be used in the example calibration and testing system of FIG. 1.

Referring now to FIG. 4, an antenna 104 under test from an example probe 110 is shown. The antenna 104 under test in FIG. 4 is a linear vertical antenna. However, the polarization of the electromagnetic energy from the antenna 104 may still be rotated, diffracted, and the like. To maximize the energy collected from the antenna under test, the probe 110 may be dual polarized enabling the probe to transmit and receive most types of polarized signals. Dual polarization of the probe 110 may be provided by including crossed and interleaved antennas 144*a-b* such that the antennas are positioned orthogonal relative to one another.

The probe 110 of FIG. 4 is shown positioned adjacent and in close proximity to the antenna 104 under test. As can be seen in FIG. 4, the antenna 104 under test defines a substantially vertical plane 146. Similarly, the crossed and interleaved antennas 144*a-b* of the probe each define a plane 148*a-b* substantially perpendicular relative to each other. In an example configuration, the probe 110 may be positioned adjacent to the antenna 104 such that the planes 148*a-b* defined by the antennas 144*a-b* of the probe are substantially perpendicular relative to the vertical plane 146 defined by the antenna under test as shown in FIG. 4.

Calibration, testing, and troubleshooting may necessitate a stable output signal from the probe 110. Further, signal quality may depend on the distance of the probe 110 to the antenna 104—signal quality may improve as the probe is positioned closer to the antenna. Accordingly, the probe 110 in this example may operate in the near field zone of the antenna 104 under test. Those skilled in the art understand that the near field zone is the area less than one wavelength from the front of the antenna 104. Because the probe 110 operates in the near field zone, the probe is less sensitive to interference from, for example, reflections or other antennas nearby. However, those skilled in the art will appreciate that mutual coupling effects between the antenna 104 and the probe 110 may occur if the probe is positioned too close to the antenna. Thus, those skilled in the art will understand that the optimum distance between an antenna 104 and a probe 110 may depend on, for example, the testing environment and/or the characteristics of the antenna and the probe. However, in some situations, for example, a suitable distance between an antenna 104 and a probe 110 may be around 1" (one inch) to 1.125" (one and one-eighth inch).

As seen in FIG. 4, each antenna 144*a-b* of the example probe is connected to a broadband power combiner 150. As discussed above, the probe 110 is designed to maximize the amount of energy collected from an antenna 104 under test. The power combiner 150 may combine the power signals from each probe antenna 144*a-b* into a single power signal representing the total amount of energy collected from an antenna 104 under test. For example, the vertical probe antenna 144*a* may collect 62% (sixty-two percent) of the energy emitted from the antenna 104 under test, and the horizontal probe antenna 144*b* may collect 37% (thirty-seven percent) of the energy emitted from the antenna under test. The power combiner 150 may combine the signals from each probe antenna 144*a-b* into a signal representing the overall amount of energy collected from the antenna under test, 99% (ninety-nine percent) in this example. A suitable power combiner may be, for example, a Wilkinson power divider/combiner. Further, the probe may include a Wilkinson power divider/combiner printed on the probe antennas 144*a-b*.

The probe 110 may be tuned by rotating the probe in a clockwise or counterclockwise direction relative to the antenna under test as shown by the arrow 152 in FIG. 4. During calibration, testing, or troubleshooting, the probe 110 may be rotated between ±45° relative to the antenna 104 under test until a maximum signal strength (power) is determined. Further, some calibration, testing, or troubleshooting routines may set the antenna 104 for continuous transmission while other calibration, testing, or troubleshooting routines set the antenna for other transmission modes.

Figure 5:
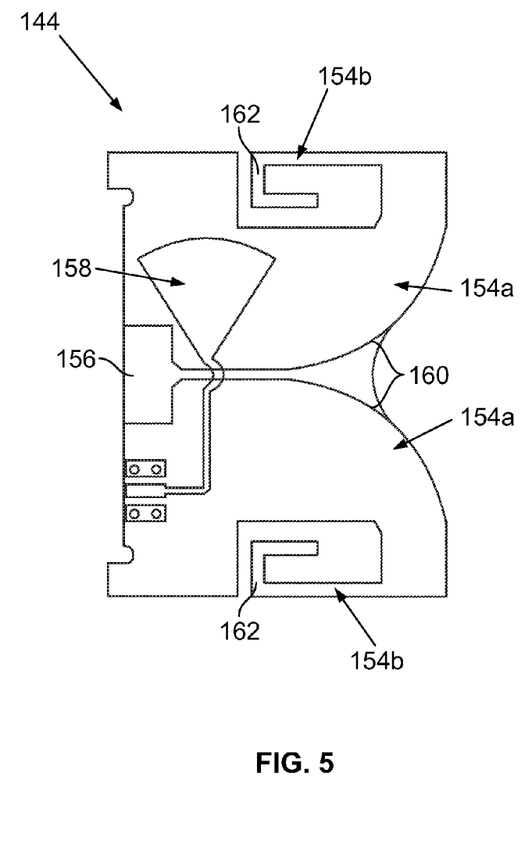
FIG. 5 is a side view of a portion of a probe that may be used in the example calibration and testing system.

Turning now to FIG. 5, an example probe antenna 144 is shown. The probe antenna 144 is designed to operate in the WiFi frequency bands in order to test and calibrate the antennas of a wireless access device. Accordingly, the probe antenna 144 includes two radiating sections 154*a-b* operating, in this example, between 1.5 GHz and 8 GHz. The first radiating section 154*a* radiates around the 5 GHz frequency band allowing the probe to interface with the 802.11a radios of the wireless access device under test. Similarly, the second radiation section 154*b* radiates around the 2.4-2.5 GHz frequency bands allowing the probe to interface with the 802.11a, b, g radios of the wireless access device under test.

The probe antenna 144 may be a patch antenna as shown in FIG. 5. Those skilled in the art will understand that a patch antenna is an antenna in which a metal patch is suspended on, over, or within a dielectric substrate 156. A feedline 158 such as, for example, a microstrip may carry the RF signals to and from the antenna 144.

Further, the example probe antenna 144 may also be a notch antenna as shown in FIG. 5. Those skilled in the art will understand that a notch antenna is an antenna in which the radiation pattern is determined by the size and/or shape of a notch (also referred to as a slot) formed by the antenna. Further, radiation occurs at the notch as a result of the microstrip crossing the notch as shown by way of example in FIG. 5. The notch 160 of the antenna in the example shown has a tapered and flared shape. Those skilled in the art will recognize that this type of antenna may be referred to as a tapered slot antenna, a Vivaldi notch antenna, a Klopenstein notch antenna, and a Tschebichev notch antenna. The tapered and flared shape of the notch 160 allows the antenna 144 to operate around the 3.5 GHz and the 6 GHz frequency bands.

Moreover, the example probe antenna may further include spiraled antenna arms 162 as shown in FIG. 5. The spiraled antenna arms 162 allow the antenna to operate around the 2.4-2.5 GHz frequency bands. By including 2.4 GHz radiating sections and 5 GHz radiating sections, the probe may respectively transmit and receive radio signals to and from wireless access devices having 802.11a and 802.11abg radios. As mentioned above, the crossed and interleaved Vivaldi notch antennas provide dual polarization enabling the probe to collect much of the emitted energy from an antenna under test. Finally, the notches of each antenna may be coupled via a power divider (not shown) printed on the dielectric substrate of the antenna.

Figure 6:
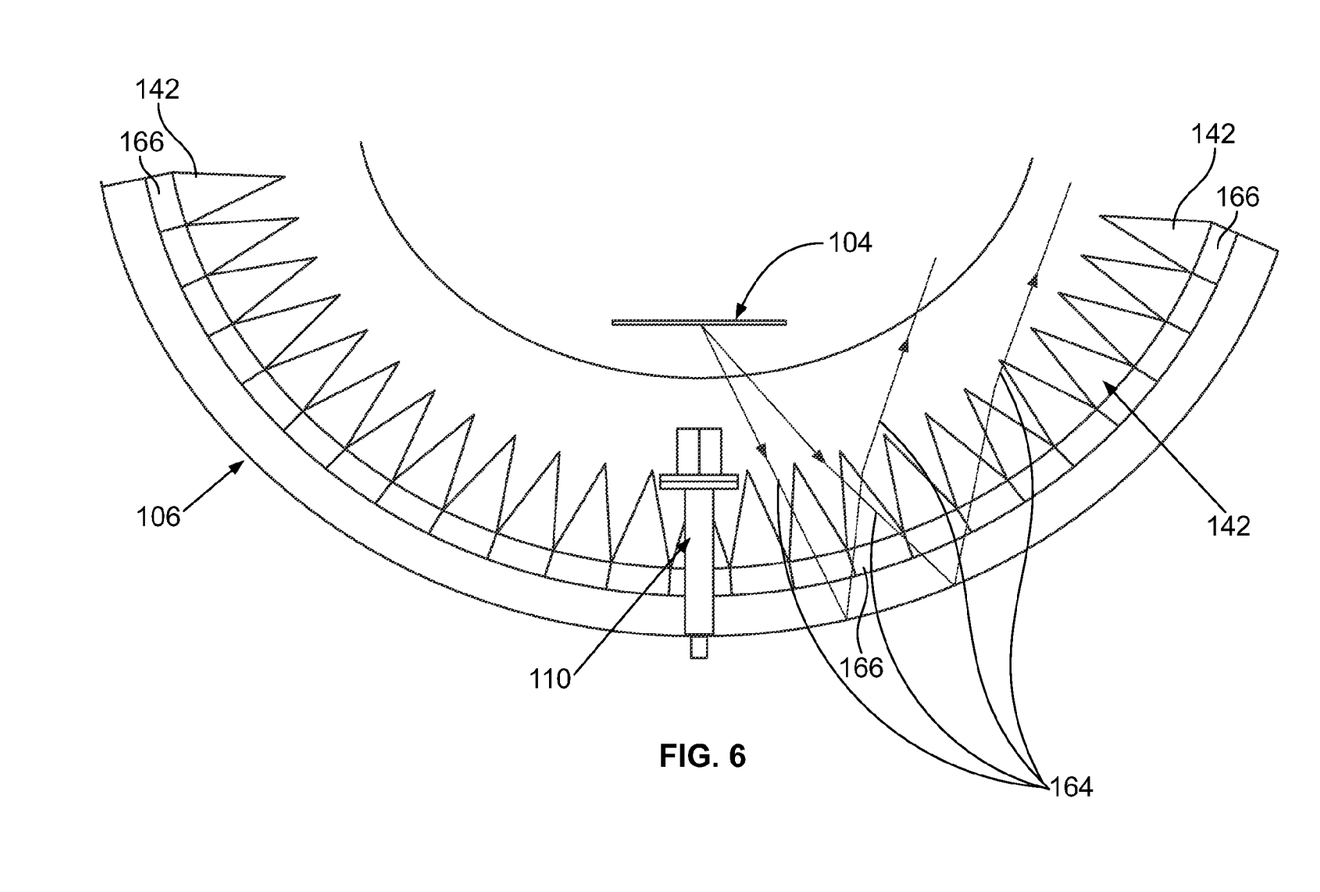
FIG. 6 is a portion of a top cross-sectional view illustrating a probe assembly and an antenna under test in the example calibration and testing system.

Referring now to FIG. 6, the operation of an antenna 104 under test is illustrated. As seen in FIG. 6, the antenna 104 under test emits RF signals 164 towards the probe 110. As mentioned above with reference to FIG. 2, some of the RF signals 164 from the antenna 104 may be deflected away from the probe and/or reflected off of the interior wall of the housing 106. As the RF signals 164 are deflected and reflected, the signals pass through the layers of broadband absorbing material including the pyramidal absorbers 142 and a second layer 166 of absorbing material applied to the interior surface of the chamber 108. The cylindrical shape of the housing 106 and the absorbing layers 142, 166 act to attenuate the deflected and reflected RF signals 164 thus preventing the signals from returning to the probe 110 or antenna 104 under test.

Figure 7:
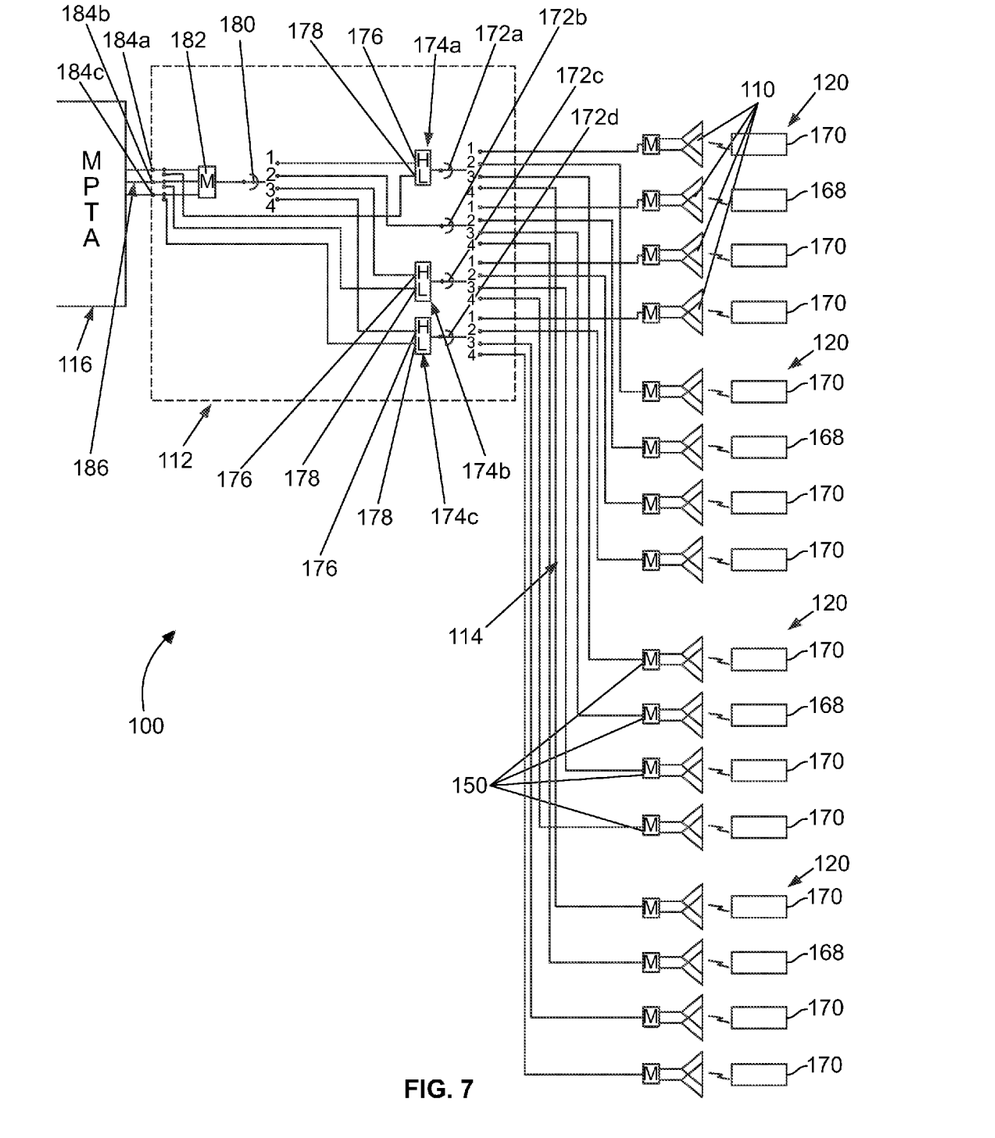
FIG. 7 is a schematic representation of the example calibration and testing system illustrating antennas of a wireless access device aligned with probes of the calibration and testing system.

In reference to FIG. 7, a schematic view of an example calibration and testing system 100 for a wireless access device is shown. In particular, a schematic view of a controller 112 for a wireless testing and calibration system 100 is shown. The controller 112, in this example, is a switching control device that routes signals from a wireless access device 102 under test to a signal analyzer 116. Those skilled in the art will understand that the switching control device 112 of FIG. 7 is but one embodiment of a controller that may be used to route signals from a wireless access device under test to a signal analyzer.

The switching control device 112, in the example shown, may be used to calibrate, test, and troubleshoot a wireless access devices having four sectors with four radios in each sector. In particular, the example wireless access device of FIG. 7 includes four sectors, and each sector includes one 802.11a radio module 168 and three 802.11a, b, g radio modules 170 (or three 802.11b, g radio modules), for a total of 16 radio modules. A probe 110 is associated with each antenna of the radio modules 168, 170. The output from each probe antenna is transmitted to a power combiner 150, and a coaxial cable 114 connects the power combiner to one of 16 input ports of the example switching control device 112. The coaxial cables 114 may be, for example, SubMiniature Version A (SMA) cable assemblies.

The calibration and testing system 100 may calibrate, test, or troubleshoot the integrated radio modules of a wireless access device one at a time. Accordingly, the switching control device 112 may include various switches to provide and switch among pathways between radio modules 168, 170 under test and the signal analyzer 116. The switching control device 112, in this example shown, includes four single-pole, four-throw (SP4T) switches 172a-d for selecting one of the 16 radio modules 160, 170 under test. As seen in the example switching control device 112, the SP4T switches 172a-d are each associated with a particular radio module 168, 170 of each sector 120 of the wireless access device. For example, the first SP4T switch 172a may toggle between the first radio module 170 of each sector 120. Similarly, the second, third, and fourth SP4T switches 172b-d may respectively toggle between the second, third, and fourth radio module of each sector 120.

Further, the switching control device 112 in the example shown includes three diplexers 174a-c having a high-pass filter port 176 and a low-pass filter port 178. The diplexers 174a-c are used to implement frequency domain multiplexing for the 802.11a, b, g radio modules of a wireless access device, which operate around the 2.4 GHz (802.11b, g) or the 5 GHz (802.11a) frequency bands. Thus, the diplexers 174a-c split a signal from an 802.11a, b, g radio module into its high-frequency (802.11a at 5 GHz) and low-frequency (802.11b, g at 2.4 GHz) components. As seen in FIG. 7, the first, third, and fourth SP4T switches 172a, 174c-d are each respectively coupled to a diplexer 174a-c since the first, third, and fourth SP4T switches are associated with 802.11a, b, g (or 802.11b, g) radio modules in this example.

It then follows that the second SP4T switch 172b is not connected to a diplexer since the second SP4T switch is only associated with 802.11a radio modules 168 operating in the 5 GHz frequency band in this example. Instead, the second SP4T switch 172b is coupled to a fifth SP4T switch 180. The high-pass filter ports 176 of the three diplexers 174a-c, representing the high-frequency (5 GHz) components of the signals from the 802.11a, b, g radio modules are also connected to the fifth SP4T switch 180. Accordingly, the fifth SP4T switch 180 may be used to switch between radio modules 168, 170 operating according to the 802.11a standard. The fifth SP4T switch 180 is connected to a splitter/combiner 182 that equally splits the 802.11a signal among three output ports of the splitter/combiner for transmission to the signal analyzer 116.

Three main switches 184a-c respectively toggle between the three output ports of the splitter/combiner 182, which provides the pathways for the 802.11a radio modules and the three low-pass filter ports 178 of the three diplexers 174a-c, which provide the pathways for the 802.11bg radio modules. As seen in FIG. 7, the switching control device, in this example, may be connected to a signal analyzer 116 via three transmission lines 186.

The signal analyzer 116 may be, for example, a vector signal analyzer or a spectrum analyzer. The signal analyzer 116 may be used to examine the signature of the signal from a radio module 168, 170 under test to ensure the radio modules are operating within specified standards. For example, the signal analyzer 116 may be used to asses the signal modulation clarity and determine if the signal modulation clarity meets specifications for the wireless access device. Those skilled in the art will appreciate that additional or alternative characteristics relating to the signal from a radio module of a wireless access device may be measured and verified using the system described herein.

Additionally, the signal analyzer may be used to determine whether a radio module of a wireless access device is properly calibrated by comparing signals from an antenna of a radio module against calibration tables for the wireless access device. Calibration tables represent the logic behind the operation of the integrated radio modules of a wireless access device. Wireless access devices having multiple integrated radio modules may operate on different channels at each radio. Further, the radio modules of a wireless access device may adjust their operation in different usage scenarios. The calibration tables provide the operational metrics for different usage scenarios such as, for example, the power level at each radio module in a particular usage scenario. Accordingly, each radio module may be tested one at a time and channel by channel to verify that the power level from the radio matches the expected power level from an optimally performing radio module.

The calibration and testing system described herein provides operators the ability to calibrate radio modules within ±1 dB of the performance standards set forth in the various calibration tables. The calibration and testing system also enables operators to identify hardware problems at the radio modules of a wireless access device. For example, based on the results from the signal analyzer, an operator may determine that the antenna of a radio module is open or short at its feedpoint.

An example calibration, testing, or troubleshooting routine may be performed manually whereby an operator examines the output of the signal analyzer and compares the results to calibration and specification tables. Alternatively, a computing device may be coupled to the signal analyzer and programmed to compare the results to calibration and specification tables stored at the computing device. The computing device may also be programmed to notify an operator whether the radio modules of a wireless access device under test satisfy various specifications and standards. Thus, the computing device may automate the process of calibrating, testing, and troubleshooting a wireless access device under test thereby minimizing the role of the operator.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that a certain of the details described herein can be varied considerably without departing from the basic principles of the invention.

What is claimed is:

1. A system for testing a wireless access device having a plurality of radio modules comprising:
    a housing having an interior chamber, wherein the interior chamber is adapted to receive the wireless access device;
    a plurality of interior walls that surround the interior chamber and form an interior perimeter;
    a signal absorber attached to at least one of the interior walls;
    a plurality of probes coupled to a signal analyzer, adapted to receive radio signals from the plurality of radio modules of the wireless access device and to transmit the radio signals to the signal analyzer for analysis and comparison against a calibration table, wherein the plurality of probes are positioned around the interior perimeter of the interior chamber for respective alignment with an antenna of a corresponding radio module of the wireless access device and are further adapted for positioning adjacent to the antenna of the corresponding radio module and to operate in a near field zone of the antenna of the corresponding radio module; and
    a mounting fixture adapted to support the wireless access device in the interior chamber and adapted to position the wireless access device such that each probe of the plurality of probes is aligned with an antenna of the corresponding radio module of the wireless access device.

2. The system of claim 1 wherein the plurality of probes are positioned towards a central region of the interior chamber.

3. The system of claim 1 wherein the plurality of probes are coupled to a control device adapted to select a probe of the plurality of probes and transmit the radio signals received at the selected probe to the signal analyzer.

4. The system of claim 3 further comprising an opening in an upper portion of the housing allowing passage of interface cables into the interior chamber for coupling to the wireless access device.

5. The system of claim 3 wherein the control device provides for testing of the plurality of radio modules in a sequential fashion.

6. The system of claim 5 wherein the control device includes a plurality of switches for selecting an individual probe aligned with a respective antenna of the corresponding radio module of the wireless access device.

7. The system of claim 6 wherein each switch of the plurality of switches is configured for association with a corresponding radio module of a sector of the wireless access device.

8. The system of claim 6 wherein the control device includes a plurality of diplexers for frequency domain multiplexing of the radio signals received at the plurality of probes.

9. The system of claim 1 wherein the signal absorber is a conductive foam layer having a plurality of pyramid-shaped structures positioned towards a center region of the interior chamber.

10. The system of claim 1 wherein the housing has a cylindrical shape.

11. The system of claim 10 wherein the cylindrical housing further comprises a first metallic cylinder half coupled to a second metallic cylinder half at a pivot point allowing the first metallic cylinder half and the second metallic cylinder half to pivot relative to one another so as to provide access to the interior chamber and wherein the signal absorber is attached to each of the interior walls of the interior chamber.

12. The system of claim 11 further comprising a gasket attached to a frame of at least one of the first cylinder half and the second cylinder half wherein the gasket is adapted to shield the interior chamber from electromagnetic interference external to the housing.

13. The system of claim 1 further comprising a reflector ring adapted to be positioned on the wireless access device adjacent to antennas of the radio modules of the wireless access device.

14. The system of claim 1 wherein the probe is dual-polarized for receipt of polarized signals.

15. The system of claim 14 wherein the probe is adapted to operate in the WiFi frequency bands.

16. The system of claim 14 wherein the probe comprises:
    a first antenna;
    a second antenna; and
    wherein the first antenna is interleaved with and positioned orthogonally to the second antenna.

17. The system of claim 16 wherein the first antenna defines a first plane and the second antenna defines a second plane substantially perpendicular to the first plane and wherein the first plane of the first antenna and the second plane of the second antenna are both substantially perpendicular to a plane defined by an antenna of a corresponding radio module of the wireless access device.

18. The system of claim 16 wherein the first antenna and the second antenna of the probe are each a patch antenna.

19. The system of claim 18 wherein the probe is adapted to operate substantially between the 1.5 GHz frequency band and the 8 GHz frequency band.

20. The system of claim 19 wherein the first antenna and the second antenna of the probe each comprise a first radiating section adapted to interface with IEEE standard 802.11b or 802.11g radio modules and a second radiating section adapted to interface with IEEE standard 802.11a radio modules.

21. The system of claim 20 wherein the first radiating section comprises a spiraled antenna arm and the second radiating section comprises a tapered slot.

22. The system of claim 16 further comprising a power combiner coupled between the first antenna and the second antenna for combining the signals received at the first antenna and the second antenna.

23. The system of claim 22 wherein the power combiner is printed on a circuit board of at least one of the first antenna and the second antenna.

24. The system of claim 14 wherein the probe is adapted to be rotated in a clockwise or a counterclockwise direction for tuning the probe.

25. The system of claim 24 wherein the probe is adapted to be rotated substantially between −45° and +45° relative to an antenna of a corresponding radio module of the wireless access device until a maximum signal strength is determined.

26. A method for testing a wireless access device having a plurality of radio modules comprising:
   placing the wireless access device into an interior chamber of a housing, wherein a plurality of probes are positioned around an interior perimeter of the interior chamber for respective alignment with an antenna of a corresponding radio module of the wireless access device;
   aligning each probe of the plurality of probes with an antenna of a corresponding radio module of the wireless access device, wherein the plurality of probes are adapted to receive radio signals from the plurality of radio modules of the wireless access device;
   positioning the plurality of probes in a near field zone of the antenna of the corresponding radio module of the wireless access device;
   transmitting the radio signals received at the plurality of probes to a signal analyzer for analysis;
   analyzing the radio signals received at the signal analyzer; and
   comparing the analyzed radio signals to a calibration table.

27. The method of claim 26 further comprising testing the plurality of radio modules of the wireless access device in a sequential fashion.

28. The method of claim 27 further comprising selecting with a control device an individual probe of the plurality of probes.

29. The method of claim 26 further comprising rotating a probe of the plurality of probes in a clockwise or counterclockwise direction to tune the probe.

30. The method of claim 26 further comprising rotating a probe of the plurality of probes substantially between −45° and +45° relative to an antenna of a corresponding radio module of the wireless access device until a maximum signal strength is determined.

31. The method of claim 26 further comprising coupling at least one interface cable to the wireless access device through an opening in an upper portion of the housing.

* * * * *